United States Patent

Hirase

[11] Patent Number: 5,954,287
[45] Date of Patent: Sep. 21, 1999

[54] RETRACTOR FOR A SEAT BELT

[75] Inventor: Satoshi Hirase, Kanagawa, Japan

[73] Assignee: NSK Ltd., Tokyo, Japan

[21] Appl. No.: 09/075,344

[22] Filed: May 11, 1998

[30] Foreign Application Priority Data

May 9, 1997 [JP] Japan .................................. 9-119684

[51] Int. Cl.⁶ ................................................. B60R 22/28
[52] U.S. Cl. ....................................................... 242/379.1
[58] Field of Search ........................ 242/379.1; 280/805, 280/806; 297/470, 471, 472

[56] References Cited

U.S. PATENT DOCUMENTS

| 3,857,528 | 12/1974 | Fiala ........................... | 242/379.1 |
| 4,322,046 | 3/1982 | Tanaka et al. ................ | 242/379.1 |
| 5,636,806 | 6/1997 | Sayles ......................... | 242/379.1 |
| 5,794,877 | 8/1998 | Ono et al. .................... | 242/379.1 |

FOREIGN PATENT DOCUMENTS

| 46-7710 | 1/1971 | Japan . |
| 57-6948 | 2/1982 | Japan . |
| 97/04996 | 2/1997 | WIPO . |

*Primary Examiner*—John M. Jillions
*Attorney, Agent, or Firm*—Sughrue, Mion, Zinn, Macpeak & Seas, PLLC

[57] ABSTRACT

In a retractor for seat belt according to the present invention, a stopper mechanism 50 is provided between a side plate 101a and a bobbin 1. The stopper mechanism 50 is composed of a through hole 110 formed in the side plate 101a by drawing the same inwardly, and three lock pieces 3 which are respectively disposed on the locking base side end face of the bobbin 1 and are engageable with the inner peripheral surface of the through hole 110 so as to stop the rotation of the bobbin 1 in the webbing drawn-out direction thereof with respect to the side plate 101a. In addition, a control plate 4 is interposed between a locking base 5 and the bobbin 1. When a torsion bar 2 is torsionally deformed and in turn the amount of rotation of the bobbin 1 in the webbing drawn-out direction thereof with respect to the locking base 5 reaches or exceeds a predetermined amount, the control plate 4 brings the lock pieces 3 into engagement with the inner peripheral surface of the through hole 110 so as to restrict the deformation amount of a plastically deforming member to a predetermined range of amount.

21 Claims, 7 Drawing Sheets

RETRACTOR FOR A SEAT BELT

BACKGROUND OF THE INVENTION

The present invention relates to a retractor (a wind-up apparatus) for a seat belt and, in particular, to a retractor for a seat belt having an energy absorption mechanism.

Conventionally, as a retractor for a seat belt which is used to hold a passenger or the like of a vehicle safely with respect to a seat of the vehicle, there is used a retractor of an emergency lock type which includes an emergency lock mechanism for locking the retractor physically by means of inertia sensing means capable of responding to a rapid acceleration, a collision, or a rapid deceleration, thereby being able to restrain the passenger effectively and safely.

On the other hand, when a shock due to a collision is extremely great, the tension of a webbing increases with the passage of time after the collision to thereby cause a rapid deceleration in the body of the passenger, so that the load to be applied from the webbing onto the passenger becomes extremely large. In view of this, conventionally, there have been proposed various types of seat belt devices each including an energy absorption mechanism which, when the load to be applied onto the webbing becomes equal to or more than a predetermined value which has been previously set, causes a seat belt to be played out a predetermined amount to thereby absorb the shock that is produced in the body of the passenger to thereby be able to protect the body of the passenger against the collision shock positively. As the thus structured retractor for use in the seat belt, there is known "An energy absorption device especially for use in a safety belt" which is disclosed in Japanese Patent Unexamined Publication No. Sho. 46-7710.

The above-mentioned energy absorption device comprises a winding member (that is, a bobbin) to which the energy absorption device transmits a force, a holder (that is, a retractor base) which can be rotated relatively with respect to the winding member, and a torsion bar (that is, a twist rod) which is interposed between the holder and winding member. In a vehicle emergency, a gear (that is, a locking member) disposed in one end portion of the torsion bar is secured to a securing lever and is thereby connected to the holder in an unrotatable manner. On the other hand, the other end portion of the torsion bar is previously connected with the winding member in an unrotatable manner. For this reason, when a torque in a webbing drawn-out direction is further applied to the winding member, the torsion bar is twisted about its own axis and is thus deformed plastically, so that the vehicle emergency energy such as the collision energy acting on the body of the passenger can be absorbed as the deformation work of the torsion bar which, as described above, serves as a plastically deforming member.

However, in this case, the amount of twisting or torsional deformation of the torsion bar (namely, the energy absorption stroke thereof) is not restricted and, in a state that the torsional deformation amount is not restricted, the amount of drawn-out of the webbing is excessively large, which increases the possibility that, in a vehicle having a small indoor space, the passenger is subjected to a so-called secondary collision.

In order to avoid this, as a retractor for use in a seat belt comprising an energy absorption mechanism which includes stopper members for restricting the energy absorption stroke, for example, there is proposed a retractor under the name of "A wind-up apparatus for use in a safety belt" which is disclosed in Japanese Patent Examined Publication No. Sho. 57-6948.

In the energy absorption mechanism employed in the above-disclosed wind-up apparatus, to a latch plate (which serves as a locking member) mounted on a webbing winding shaft, there is fixed a first member which is arranged coaxial with the webbing winding shaft, and a second member is fixed to the webbing winding shaft in such a manner that it is opposed to the first member, while there is mounted a rolling body (which serves as plastically deforming member) on a groove formed in at least one of the first and second members. That is, when the rolling body is rolled on the groove, the groove is plastically deformed by the movement of the rolling body, so that the collision energy acting on the body of the passenger can be absorbed as the plastical deformation work of the groove. In addition, as a stopper mechanism, a key is planted in the neighborhood of the end of the above groove; that is, the advance of the rolling body is stopped by the key thus implanted, thereby being able to restrict the energy absorption stroke.

However, in the above-mentioned stopper mechanism using the key, when the stopper mechanism is in operation, a large load is applied to the key planted in the groove and, therefore, the key must maintain a sufficient stopper strength. In addition, in the above-mentioned stopper mechanism, when the energy absorption is ended, the rotation of the webbing winding shaft is stopped by the latch plate locked to the retractor base. This stopping operation makes it necessary that the above-mentioned rolling body as well as the above-mentioned first and second members existing between the latch plate and webbing winding shaft respectively should have a final strength, which can endure all of the tension forces finally applied to the webbing.

That is, in order to be able to restrain the passenger for sure in a vehicle emergency, all of the parts existing between the above-mentioned latch plate and the above-mentioned webbing winding shaft must have a sufficient strength and, therefore, they must be made of expensive materials and must be produced according to a complicated working method, so that the production costs of these parts are high.

SUMMARY OF THE INVENTION

In view of the above-mentioned circumstances of the prior art, the present invention aims at eliminating the above-mentioned drawbacks found in the conventional retractors for use in a seat belt. Accordingly, it is an object of the invention to provide a retractor for use in a seat belt including an inexpensive energy absorption mechanism which is surely able to restrict the torsional deformation amount of the plastically deforming member to a predetermined range of amount.

The above-mentioned object can be attained by a retractor for use in a seat belt according to the present invention, comprising:

a shaft rotatably mounted on a retractor base and being torsionable;

a bobbin unrotatably fixed to one end of the shaft for winding-up a webbing thereon;

a locking member unrotatably fixed to the other end of the shaft;

an emergency lock mechanism for connecting the locking member with the retractor base and for stopping the rotation of the locking member in a webbing drawn-out direction thereof relative to the retractor base when a vehicle emergency occurs; and a bobbin lock mechanism arranged between the retractor base and the bobbin for connecting the bobbin to the retractor base and for restricting a torsion amount of the shaft to a predetermined amount when the rotation of the locking member in the webbing drawn-out direction is stopped by the emergency lock mechanism.

In the above-mentioned construction of the retractor according to the present invention, advantageously, the bobbin lock mechanism comprises:

- a lock piece supported by the bobbin and capable of taking up a non-engagement position where it is disengaged with the retractor base and an engagement position where it is engaged with the retractor base; and
- a lock piece operating mechanism for moving the lock piece from the non-engagement position to the engagement position when the shaft is torsionally deformed by the predetermined amount.

In the above-mentioned construction of the retractor according to the present invention, advantageously, the lock piece operating mechanism comprises:

- a control plate integrally rotatable together with the bobbin when the emergency lock mechanism is not operated, but rotatable relative to the bobbin when the emergency lock mechanism is operated and then the control plate becomes immovable with respect to the retractor base in such a manner that the lock piece is moved by the control plate into the engagement position in accordance with the relative rotation between the bobbin and the control plate.

In the above-mentioned construction of the retractor according to the present invention, advantageously, the bobbin comprises:

- a hold member for holding the lock piece at a predetermined position until the control plate and the bobbin become relatively rotatable.

In the above-mentioned construction of the retractor according to the present invention, advantageously, the control plate is pressed into and fixed to the bobbin.

In the above-mentioned construction of the retractor according to the present invention, advantageously, the bobbin comprises a rib projection formed on the end face of the bobbin, engageable with and crushable by the control plate, and wherein the rib projection has a triangular cross section and extends in the axial direction of the bobbin.

In the above-mentioned construction of the retractor according to the present invention, advantageously, the control plate comprises a cam portion for pushing out the lock piece outwardly when the control plate and the bobbin become relatively rotatable with respect to each other; and the bobbin comprises a lock piece support surface for supporting the lock piece when the bobbin is rotated relative to the control plate and the bobbin, in which a surface defined by the cam portion and the lock piece support surface is formed in a wedge shape.

In the above-mentioned construction of the retractor according to the present invention, advantageously, the lock piece operating mechanism comprises:

- a rotation fixing mechanism for engaging the control plate to the retractor base in the rotation direction thereof, after the shaft is torsionally deformed by the predetermined amount.

In the above-mentioned construction of the retractor according to the present invention, advantageously, the rotation fixing mechanism is provided between the control plate and the locking member.

In the above-mentioned construction of the retractor according to the present invention, advantageously, the rotation fixing mechanism comprises:

- a guide portion formed in the locking member and extending by a predetermined amount in the rotation direction of the shaft;
- a slider movable along the guide portion; and
- a slider holding portion formed in the control plate for slidably holding the slider.

In the above-mentioned construction of the retractor according to the present invention, advantageously, the guide portion is formed in a spiral shape.

In the above-mentioned construction of the retractor according to the present invention, advantageously, the slider is disposable on an initial end position which is located at the inner peripheral side of the spirally-shaped guide portion.

In the above-mentioned construction of the retractor according to the present invention, advantageously, the retractor base includes a through hole through which the shaft extends, and the lock piece is engageable with the inner peripheral surface of the through hole.

In the above-mentioned construction of the retractor according to the present invention, advantageously, the through hole is formed in the retractor base by drawing the same in a direction where the shaft extends.

In the above-mentioned construction of the retractor according to the present invention, advantageously, the inner peripheral surface of the through hole is knurled.

The above-mentioned object can also be attained by a retractor for use in a seat belt according to the present invention, comprising:

- a retractor base;
- a substantially cylindrically-shaped bobbin rotatably supported on the retractor base for winding-up a webbing thereon;
- a locking member connectable with the retractor base so as to stop the rotation of the locking member in the webbing drawn-out direction relative to the retractor base when a vehicle emergency occurs;
- a shaft, rotatably mounted on the retractor base and being torsionable, for fixedly connecting the bobbin to the locking member when the shaft is subjected to a torsional torque smaller than a predetermined torque, and also for relatively rotating the bobbin relative to the locking member through a torsional deformation of the shaft when the shaft is subjected to a torsional torque not smaller than a predetermined torque;
- a stopper mechanism provided between the retractor base and the bobbin for stopping the rotation of the bobbin in the webbing drawn-out direction with respect to the retractor base; and,
- a stopper operating mechanism for operating the stopper mechanism to thereby stop the rotation of the bobbin in the webbing drawn-out direction with respect to the retractor base when an amount of relative rotation between the bobbin and the locking member in accordance with the torsional deformation of the shaft reaches a predetermined amount.

In the above-mentioned construction of the retractor according to the present invention, advantageously, the stopper mechanism comprises:

- a peripheral surface defined by a through hole which is formed in the retractor base, the shaft extending through the through hole; and
- a lock piece supported by the bobbin and capable of taking up a non-engagement position where it is disengaged with the retractor base and an engagement position where it is engaged with the retractor base.

In the above-mentioned construction of the retractor according to the present invention, advantageously, the stopper operating mechanism comprises:

a control plate integrally rotatable together with the bobbin when the emergency lock mechanism is not operated, but rotatable relative to the bobbin when the emergency lock mechanism is operated and then the control plate becomes immovable with respect to the retractor base in such a manner that the lock piece is moved into the engagement position in accordance with the relative rotation between the bobbin and the control plate.

In the above-mentioned construction of the retractor according to the present invention, advantageously, the stopper operating mechanism further comprises:

a rotation fixing mechanism for fixedly engaging the control plate to the locking member in the rotation direction thereof after the shaft is torsionally deformed by the predetermined amount.

In the above-mentioned construction of the retractor according to the present invention, advantageously, the rotation fixing mechanism is interposed between the control plate and the locking member.

In the above-mentioned construction of the retractor according to the present invention, advantageously, wherein the rotation fixing mechanism comprises:

a guide portion formed in the locking member and extending by a predetermined amount in the rotation direction of the shaft;

a slider movable along the guide portion; and a slider holding portion formed in the control plate for slidably holding the slider.

According to the above-mentioned structure, after the rotation of the locking member in the webbing drawn-out direction is stopped in a vehicle emergency, if a rotation torque of a predetermined level or more is applied between the bobbin and locking member due to a load applied to the webbing, then the plastically deforming member (that is, a shaft) is deformed to thereby absorb the shock energy. In addition, if a relative rotation amount between the bobbin and locking member reaches or exceeds a predetermined amount, then the stopper operating mechanism operates the stopper mechanism to thereby stop directly the rotation of the bobbin with respect to the retractor base in the webbing drawn-out direction thereof, so that the torsional deformation amount of the plastically deforming member necessary to absorb the shock energy can be restricted to a suitable range of amount. Also, when the energy absorption is ended, the rotation of the bobbin is stopped directly by the retractor base through the stopper mechanism and, therefore, other parts such as the above-mentioned locking member and the like have only to be able to stand the force that deforms the plastically deforming member interposed between the bobbin and locking member, that is, they do not need to have a final strength.

Preferably, the above-mentioned stopper mechanism may be composed of a portion to be secured provided on the locking member side of the retractor base, and a securing member (a lock piece) which is disposed on the locking member side end face of the bobbin and can be engaged with the portion to be secured to thereby be able to stop the rotation of the bobbin in the webbing drawn-out direction with respect to the retractor base.

Also, preferably, the above-mentioned stopper operating mechanism may be composed of: a slider holding portion for holding a slider, which is so structured as to follow a spirally-shaped cam groove of a predetermined length formed in the bobbin side end face of the locking member, in such a manner that the slider can be slid substantially in the radial direction thereof; a cam portion which, when the rotation of the locking member with respect to the bobbin (relative rotation) is delayed; brings the securing member into engagement with the portion to be secured; and, a control plate which is interposed between the locking member and bobbin.

DETAILED DESCRIPTION OF THE EMBODIMENT OF THE INVENTION

Now, description will be given below in detail of an embodiment of a retractor for use in a seat belt according to the invention with reference to the accompanying drawings.

Figure 1:
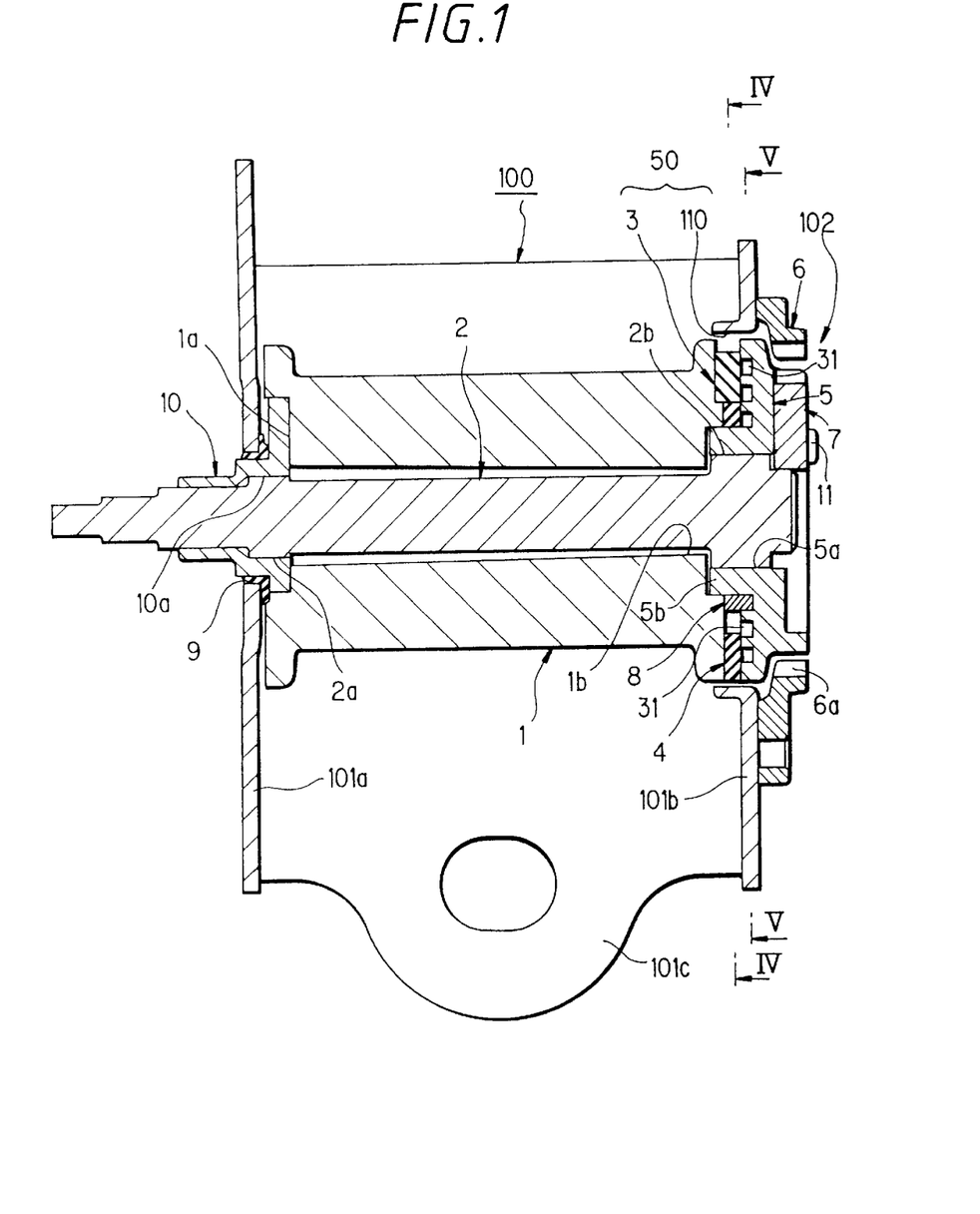
FIG. 1 is a longitudinally sectional front view of the main portions of a retractor for use in a seat belt according to an embodiment of the invention.
Figure 2:
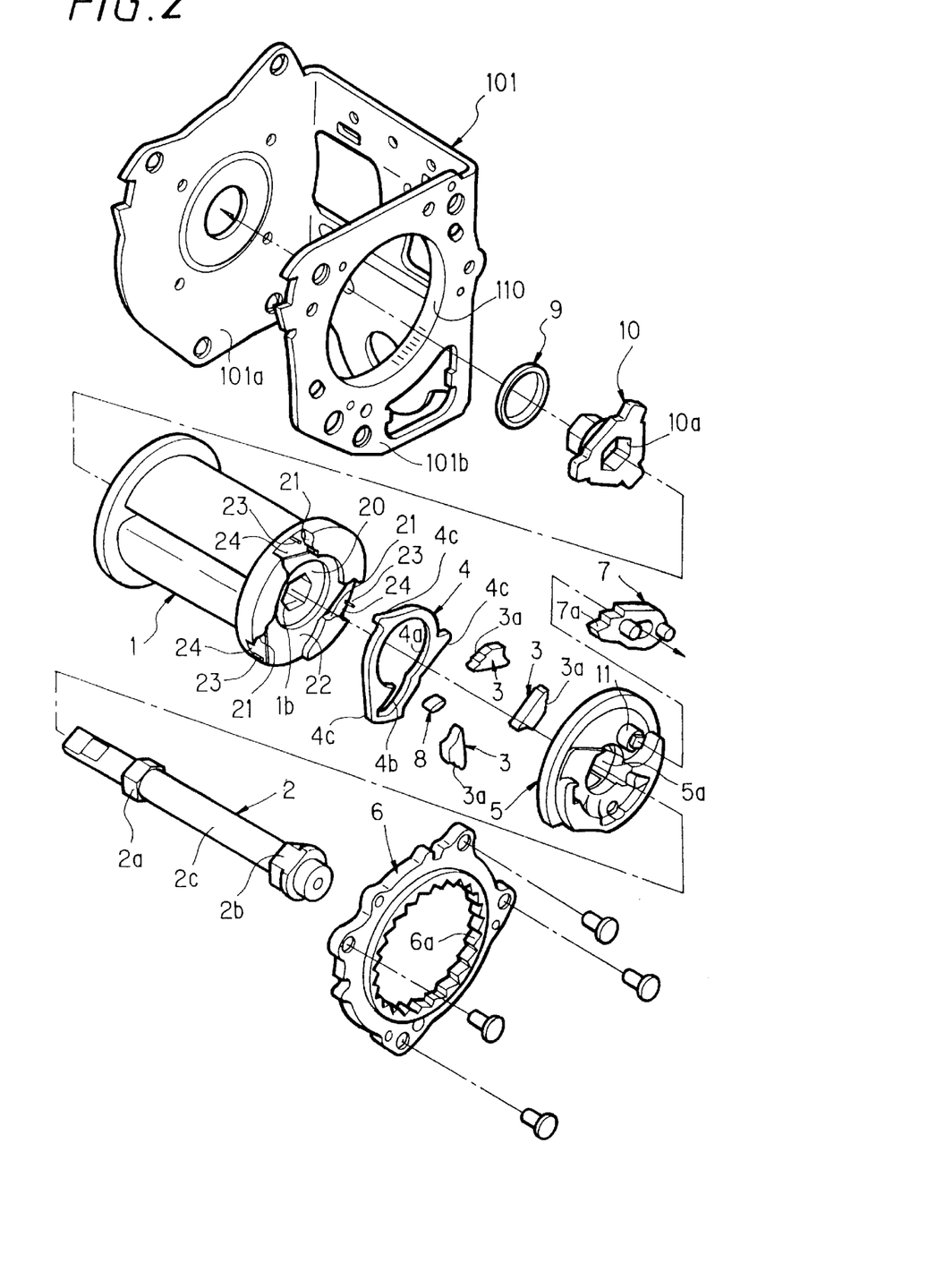
FIG. 2 is an exploded perspective view of the seat belt retractor shown in FIG. 1.
Figure 3:
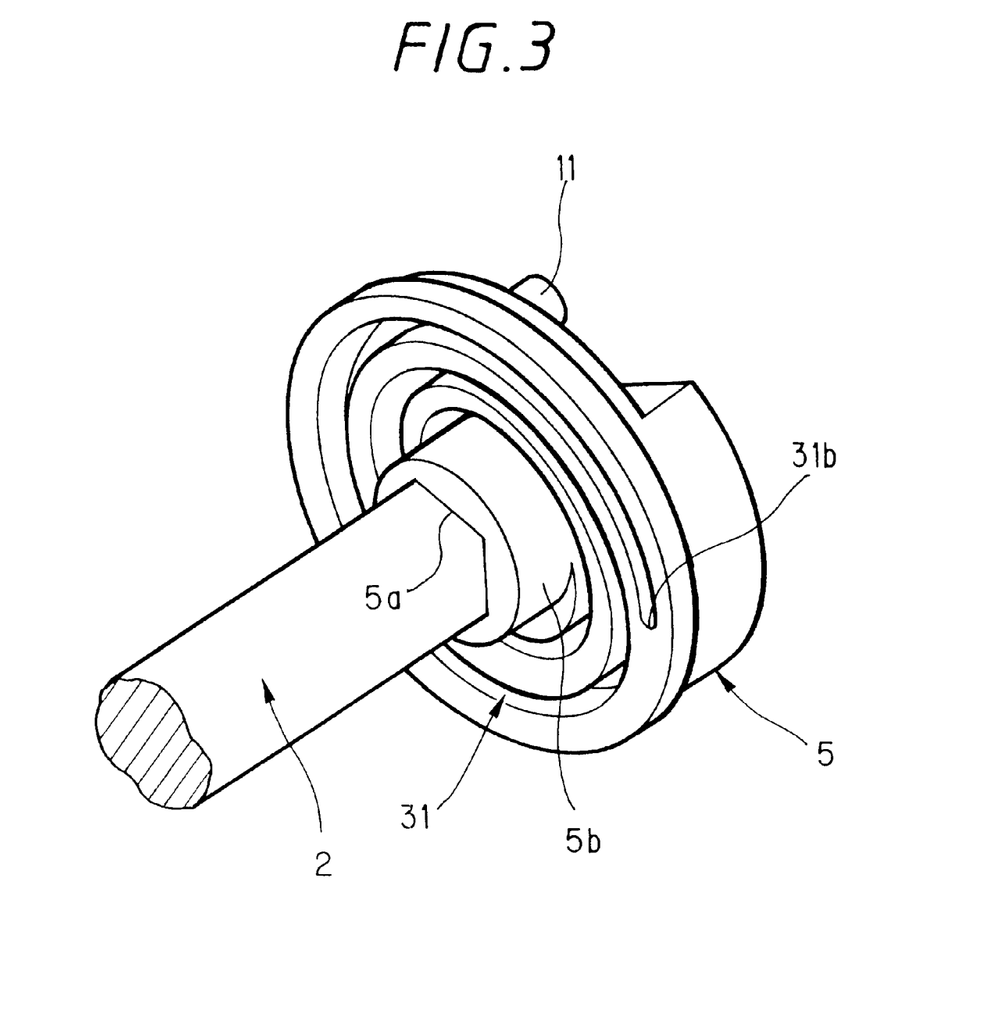
FIG. 3 is an exploded perspective view of a locking base 5 shown in FIG. 1.
Figure 4:
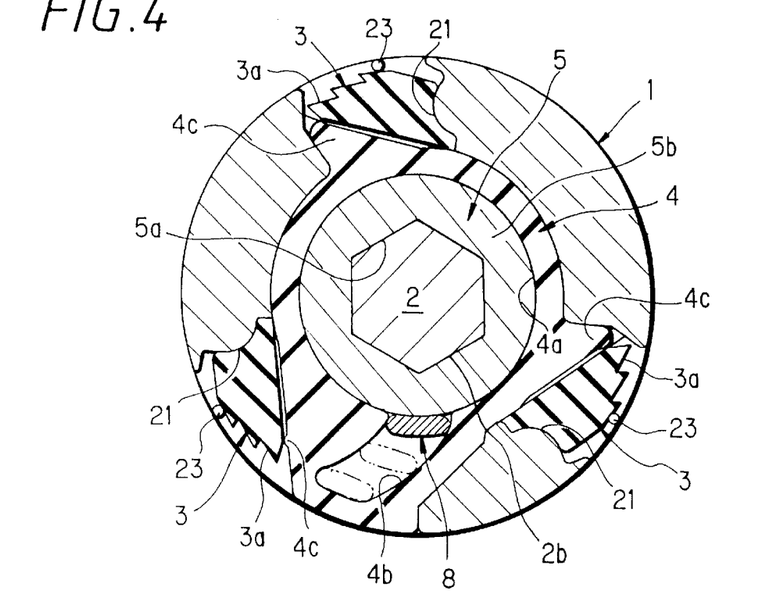
FIG. 4 is a section view taken along the line IV—IV shown in FIG. 1.
Figure 5:
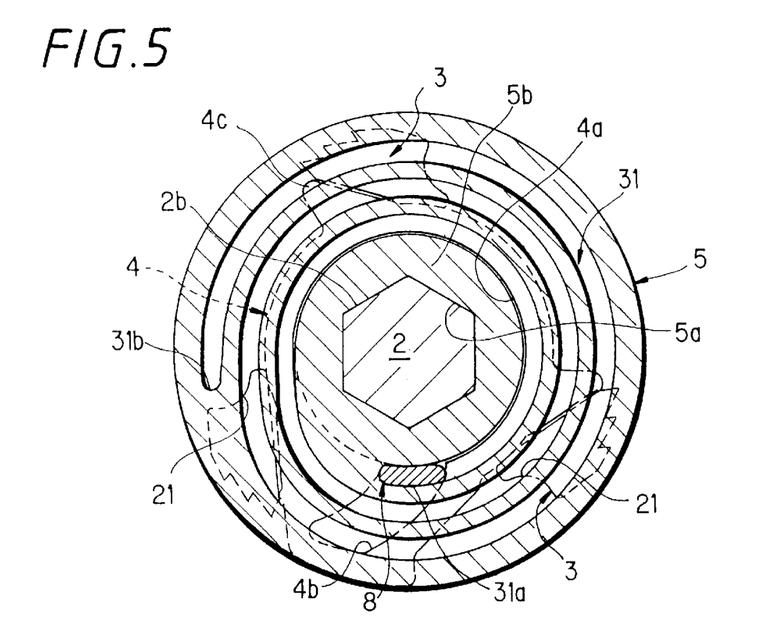
FIG. 5 is a section view taken along the line V—V shown in FIG. 1.

Here, FIG. 1 is a longitudinally sectional front view of a retractor 100 for use in a seat belt according to an embodiment of the invention; FIG. 2 is an exploded perspective view of the seat belt retractor 100 shown in FIG. 1; FIG. 3 is a perspective view of the main portions of a locking base 5 shown in FIG. 1; FIG. 4 is a section view taken along the line IV—IV shown in FIG. 1; and, FIG. 5 is a section view taken along the line V—V shown in FIG. 1.

The seat belt retractor 100 comprises: a substantially cylindrical-shaped bobbin 1 around which a webbing is to be wound; a cylindrically-shaped torsion bar (shaft) 2 which is inserted through the bobbin 1 and is rotatably supported by a retractor base 101, and also which, on one end side (in FIG. 1, on the left side) thereof, is connected integrally with the bobbin 1, and, on the other end side (in FIG. 1, on the right side) thereof, is connected integrally with a locking base 5 consisting of a disk-shaped locking member; and, an emergency lock mechanism 102 which, when an emergency occurs in a vehicle, inhibits the rotation of the locking base 5 in the webbing drawn-out direction thereof.

The retractor base 101 is formed by press molding a metal plate in such a manner that left and right side plates 101a and 101b respectively rise from the two sides of a back plate 101 to be fixed to a vehicle body, while the retractor base 101 has a substantially U-shaped section. In addition, the torsion bar 2, which is combined with the bobbin 1, is rotatably supported at the mutually opposed positions of the left and right side plates 101a and 101b of the retractor base 101. In one end portion of the torsion bar 2 that is inserted through the left side plate 101a of the retractor base 101, there is provided a well-known winding spring device (not shown) which is used to normally energize the bobbin 1 in the webbing winding direction thereof through the present torsion bar 2.

The torsion bar 2 is provided with on one end side thereof a bobbin connecting portion 2a, which can be connected with the bobbin 1 in such a manner that it can be rotated integrally with the bobbin 1. In addition, the torsion bar 2 is provided with on the other end side thereof, a locking base connecting portion 2b which can be connected with the locking base 5 in such a manner that it can be rotated integrally with the locking base 5. These respective connecting portions 2a and 2b are molded such that they respectively have a hexagonal cross section shape.

The bobbin connecting portion 2a is fitted into an insertion hole formed on one side of the bobbin 1 and having a hexagonal cross section, and it is thereby connected with the bobbin 1 in such a manner that it can be rotated integrally with the bobbin 1. On the other end side of the bobbin 1, there is formed a loose fit hole 1b into which the torsion bar 2 can be inserted in a freely rotatable manner. Also, the locking base connecting portion 2b is fitted into a hexagonal-shaped insertion hole 5a formed in the locking base 5 in such a manner that it extends through the locking base 5, so that the locking base connecting portion 2b is connected with the locking base 5 in an integrally rotatable manner.

The bobbin connecting portion 2a has a hexagonal cross section and is fitted into an insertion hole 10a having a hexagonal cross section formed in a retainer 10, which is fitted with a fitting recessed portion 1a formed on one end side of the bobbin 1, whereby the bobbin connecting portion 2a is connected with the bobbin 1 in an integrally rotatable manner. By the way, the retainer 10 is rotatably supported by the left side plate 101a through a bush 9.

Also, the locking base connecting portion 2b has a hexagonal cross section and is fitted into an insertion hole 5a having a hexagonal cross section formed in a cylindrically-shaped boss portion 5b projectingly provided on the bobbin side end face of the locking base 5, whereby the locking base connecting portion 2b is connected with the locking base 5 in such a manner that it can be rotated integrally with the locking base 5 (see FIG. 3).

The torsion bar 2 serving as a plastically deforming member includes an energy absorption mechanism which is structured such that, if a rotation torque of a predetermined level or more is applied between the two connecting portions 2a and 2b, then the deforming portion 2c thereof located between these two connecting portions 2a and 2b is torsionally deformed to thereby be able to absorb the shock energy acting on the body of the passenger.

Further, the emergency lock mechanism 102 is a mechanism which, when an emergency occurs in a vehicle (that is, when a rapid deceleration is caused due to an accident or the like, or when the webbing is rapidly drawn out, or the like), restrains the rotation of the locking base 5 in the webbing drawn-out direction thereof to thereby be able stop the rotation of the bobbin 1 in the webbing drawn-out direction thereof.

In the present invention, as the concrete structure of the emergency lock mechanism 102 which, in a vehicle emergency, restrains the rotation of the locking base 5 in the webbing drawn-out direction thereof, various kinds of well-known structures can be employed. For example, according to the present embodiment, as shown in FIG. 2, on the support shaft 11 of the locking base 5, there is supported a pawl 7 including securing teeth 7a in the leading end thereof in such a manner that the pawl 7 can be rotated. Also, on the outside of a through hole 110 formed in the right side plate 101b, there is arranged an internal toothed ratchet 6 including on the inner periphery thereof engaging internal teeth 6a with which the securing teeth 7a of the pawl 7 can be meshed, while the internal toothed ratchet 6 extends in parallel to the through hole 110 of the right side plate 101b.

In addition, the emergency lock mechanism 102 is structured such that, when a vehicle emergency occurs, it brings the securing teeth 7a of the pawl 7 into engagement with the engaging internal teeth 6a of the internal toothed ratchet 6 to thereby be able to stop the rotation of the locking base 5 in the webbing drawn-out direction thereof.

Also, between the right side plate 101b and bobbin 1, as shown in FIG. 2, there is provided a stopper mechanism 50 which is composed of the through hole 110 formed in the right side plate 101b by drawing the same inwardly, and three lock pieces 3 disposed on the locking base side end face of the bobbin 1 and engageable with the inner peripheral surface of the through hole 110 to thereby stop the rotation of the bobbin 1 in the webbing drawn-out direction thereof.

Each of the three lock pieces 3 includes, in the leading end portion thereof, securing teeth 3a which are engageable with the inner peripheral surface of the through hole 110 and, in order that the securing teeth 3a can be oscillated outwardly in the radial direction of the bobbin 1, the base end side of the lock piece 3 is in sliding contact with the lock piece seat surface 24 of the bobbin 1 in such a manner that it can be oscillated with the lock piece support surface 21 of the bobbin 1 as the fulcrum thereof.

That is, due to the fact that the securing teeth 3a formed in the leading ends of the three lock pieces 3 are respectively engaged with the inner peripheral surface of the through hole 110, the lock pieces 3 are able to prevent the bobbin 1 from rotating in the webbing drawn-out direction with respect to the right side plate 101b. By the way, the inner peripheral surface of the through hole 110 is knurled, so that the securing teeth 3a of the lock pieces 3 are able to bite the knurled inner peripheral surface of the through hole 110 positively without slipping off the same. Shear pins 23 are respectively provided in such a manner that they hang down from the lock piece seat surfaces 24 of the bobbin 1, so that the three lock pieces 3 are normally prevented from being accidentally engaged with the through hole 110 and also from becoming loose, that is, from generating strange sounds.

Further, between the locking base 5 and bobbin 1, there is interposed a control plate 4 serving as stopper operating members which, when the torsion bar 2 is torsionally deformed and the rotation amount of the bobbin 1 with respect to the locking base 5 in the webbing drawn-out direction thereof reaches or exceeds a predetermined amount, brings the lock pieces 3 into engagement with the inner peripheral surface of the through hole 110.

The control plate 4 is an annular member including a fitting hole 4a which can be fitted loosely and rotatably with the outer periphery of the boss portion 5b of the locking base 5. In addition, the control plate 4 further includes a slider holding portion 4b for holding a slider 8, which is so arranged as to move along a spirally-shaped cam groove 31 of a predetermined length formed in the bobbin side end face of the locking base 5, substantially along the radial direction of the locking base 5 in a slidable manner, and three cam portions 4c which, when the rotation of the locking plate 4 is delayed with respect to the bobbin 1, bring the respective three lock pieces 3 into engagement with the inner peripheral surface of the through hole 110.

Each of the three cam portions 4c is constituted by a projection which presses against and energizes the oscillating end side of the lock piece 3 with the securing teeth 3a formed thereon outwardly in the radial direction of the locking plate 4. The shape of the projection is set in such a manner that, if the rotation of the control plate 4 with respect to the bobbin 1 is delayed because the control plate 4 is fixed to the retractor base 101 in the rotation direction thereof or because it is fixed to the locking base 5 connected with the retractor base 101, then the projection oscillates the lock piece 3 in a direction where the lock piece 3 can be engaged with the inner peripheral surface of the through hole 110.

By the way, the control plate 4 is lightly pressed into and fixed to the bobbin 1 in such a manner that it can be in contact with the control plate seat surface 22 of the bobbin 1 and, normally, the control plate 4 can be rotated integrally with the bobbin 1; that is, there is no possibility that, in the normal running operation of the vehicle, the rotation of the control plate 4 with respect to the bobbin can be delayed accidentally.

Figure 6:
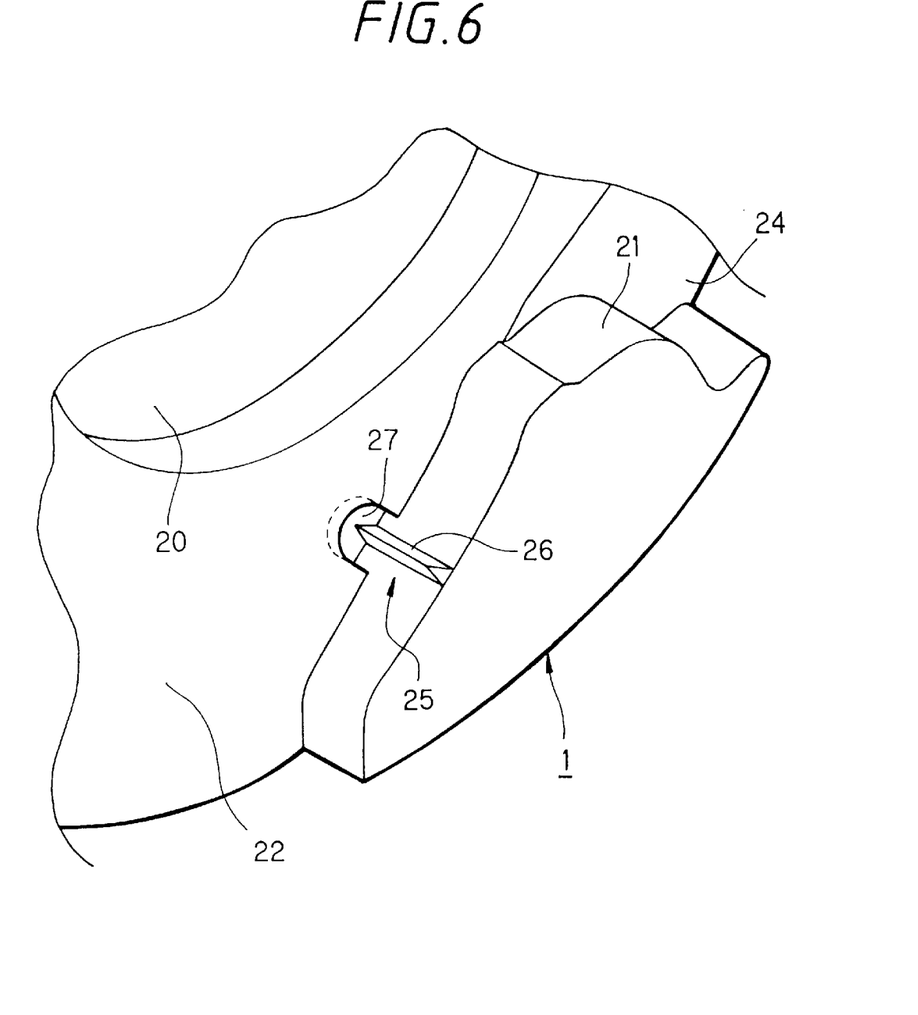
FIG. 6 is an enlarged view of the main portions of a bobbin shown in FIG. 2.

In the concrete, as shown in FIG. 6, the bobbin 1 includes a light pressure portion 25; and, the light pressure portion 25 is composed of a rib projection 26 having a triangular cross section and so provided as to extend along the axial direction of the bobbin 1, and a recessed portion 27 formed in the portion of the control plate seat surface 22 that is located adjacent to the rib projection 26. Further, the rib projection 26 is collapsed when the control plate 4 is pressed into the bobbin 1, whereby the control plate 4 can be lightly pressed into and fixed to the bobbin 1. In this fixation of the control plate 4 to the bobbin 1, even if there are produced expanded portions due to the broken pieces of the rib projection 26 or due to the deformed rib projection 26, such expanded portions are stored within the recessed portion 27, thereby eliminating the possibility that such expanded portions can interfere with the rotation of the control plate 4 in a vehicle emergency. By the way, there can also be employed another structure in which the bobbin side surface of the control plate 4 is bonded to the bobbin 1 so that the control plate 4 can be rotated integrally with the bobbin 1.

The spirally-shaped cam groove 31, as shown in FIGS. 3 and 5, is a spirally-shaped bottomed groove which extends along the outer peripheral end of the locking base 5 from the neighborhood of boss portion 5b of the locking base 5 to be inserted into a circular recessed portion 20 recessingly formed in the locking base side end face of the bobbin 1. When the bobbin 1 is rotated in the webbing drawn-out direction thereof with respect to the locking base 5, the slider 8 held in the slider holding portion 4b of the control plate 4 in the circumferential direction thereof is allowed to advance along the cam groove 31 according to the rotation amount of the bobbin 1. Further, the cam groove 31 is so set as to have such a predetermined length that, prior to the beginning of the energy absorption operation due to the torsional deformation of the torsion bar 2, the slider 8 can be situated in the initial end portion 31a of the cam groove 31 and, when the energy absorption operation is ended, the slider 8 can reach the terminal end portion 31b of the cam groove 31.

The slider 8 to be engaged with the spirally-shaped cam groove 31 is formed substantially in a cocoon shape which can be slid along the spirally-shaped cam groove 31 and the inner wall surface of the slider holding portion 4b. Further, when the bobbin 1 is rotated relatively to the locking base 5 due to the torsional deformation of the torsion bar 2, while moving the slider 8 parallel in the substantially radial direction of the control plate 4 with the rotation of the bobbin 1, the slider holding portion 4b of the control plate 4 gradually moves the slider 8 from the initial end portion 31a of the spirally-shaped cam groove 31 to the terminal end portion 31b of the cam groove 31.

Also, since the slider holding portion 4b of the control plate 4 is formed in an opening shape which extends warpingly in the opposite direction to the rotation of the bobbin 1 in the webbing drawn-out direction thereof, when the slider is moved parallel in the outer peripheral end direction of the control plate 4, even if the opening edge of the slider holding portion 4b has still burrs caused when it is produced by press-molding, the slider 8 can be prevented from being caught on the burrs, thereby being able to ensure an energy absorption stroke. Further, when compared with a structure in which the slider holding portion 4b is formed in an opening shape which extends completely along the radial direction of the control plate 4, the energy absorption stroke can be increased by an amount corresponding to the oppositely warped angle.

Next, description will be given below of the operation of the seat belt retractor 100 according to the present embodiment.

If the emergency lock mechanism 102 is operated in a vehicle emergency such as a collision or the like, then the rotation of the locking base 5 in the webbing drawn-out direction thereof connected to the other end of the torsion bar 2 is stopped. Further, in this state, if the passenger moves forwardly and, due to the load that is applied to the webbing wound of the bobbin 1, a rotation torque of a given level or more is applied onto the one end side of the torsion bar 2 through the bobbin 1, then the torsional deformation of the torsion bar 2 starts to thereby be able to absorb the shock energy.

In this shock energy absorption operation, the locking base 5 is locked by the pawl 7 to the internal toothed ratchet 6, so that the locking base 5 is prevented against rotation with respect to the right side plate 101b. Therefore, the bobbin 1, control plate 4, slider 8 and lock pieces 3 are integrally rotated with respect to the locking base 5.

Figure 7:
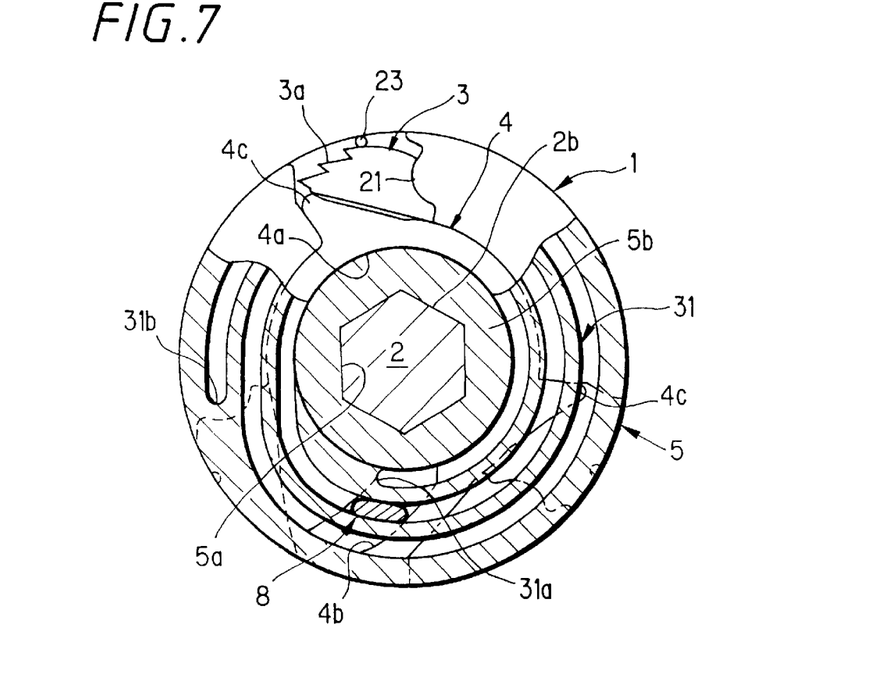
FIG. 7 is a partially broken section view taken along the line V—V shown in FIG. 1, explaining a spirally-shaped cam groove.
Figure 8:
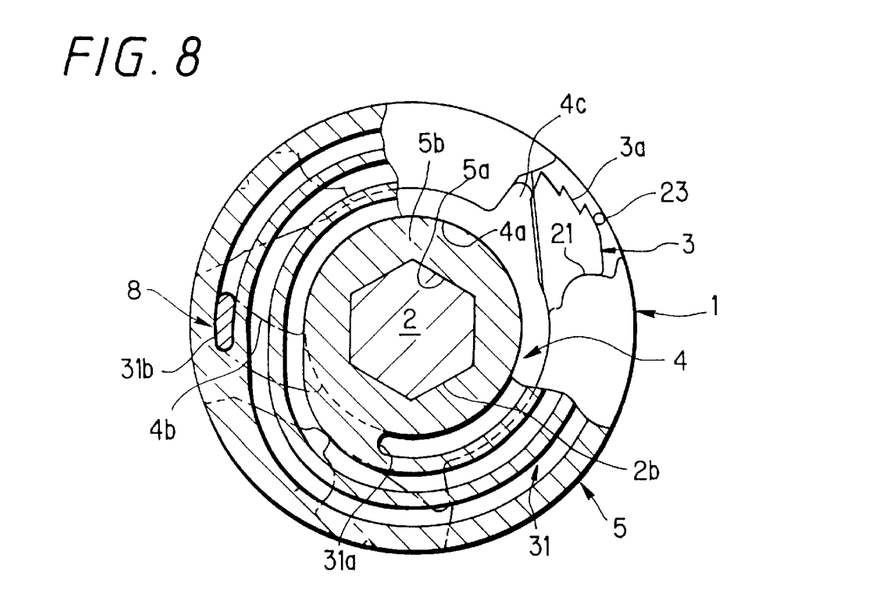
FIG. 8 is a partially broken section view taken along the line V—V shown in FIG. 1, explaining the spirally-shaped cam groove.

At that time, the slider 8, as shown in FIG. 7, is moved gradually from the initial end portion 31a of the spirally-shaped cam groove 31 toward the terminal end portion 31b of the cam groove 31 as the torsional deformation of the torsion bar 2 advances. As shown in FIG. 8, if the bobbin 1 is rotated about 2.81 times in the webbing drawn-out direction thereof, then the slider 8 reaches the terminal end portion 31b of the spirally-shaped cam groove 31 (that is, the rotation amount of the bobbin 1 in the webbing drawn-out direction due to the torsional deformation of the torsion bar 2 reaches a predetermined amount), with the result that both of the slider 8 and the control plate 4 holding the slider 8 are prevented from rotating with respect to the locking base 5. That is, the control plate 4 is fixed to the side plate 101b.

Here, if the passenger moves further forwardly to thereby draw out the webbing and a rotation torque in the webbing direction is further applied to the bobbin 1, then the light pressure fixation between the bobbin 1 and control plate 4 is removed so that the bobbin 1 is relatively rotated in the webbing drawn-out direction with respect to the control plate 4. As a result of this, since the control plate 4 is delayed in rotation with respect to the bobbin 1, the oscillating end sides of the respective lock pieces 3 rotating together with the bobbin 1 are pressed and energized by the cam portions 4c of the control plate 4, so that the securing teeth 3a of the respective lock pieces 3 are oscillated outwardly in the radial direction of the control plate 4. At that time, the shear pin 23, which has prevented the lock pieces 3 from getting loose, is sheared due to the drawn-out energy of the webbing. Since the shear pin 23 is small in diameter and thus can be sheared by very small energy when compared with the torsional force of the torsion bar 2, there is no danger that the sheared shear pin 23 can have an influence on the energy absorption characteristic of the torsion bar 2.

Figure 9:
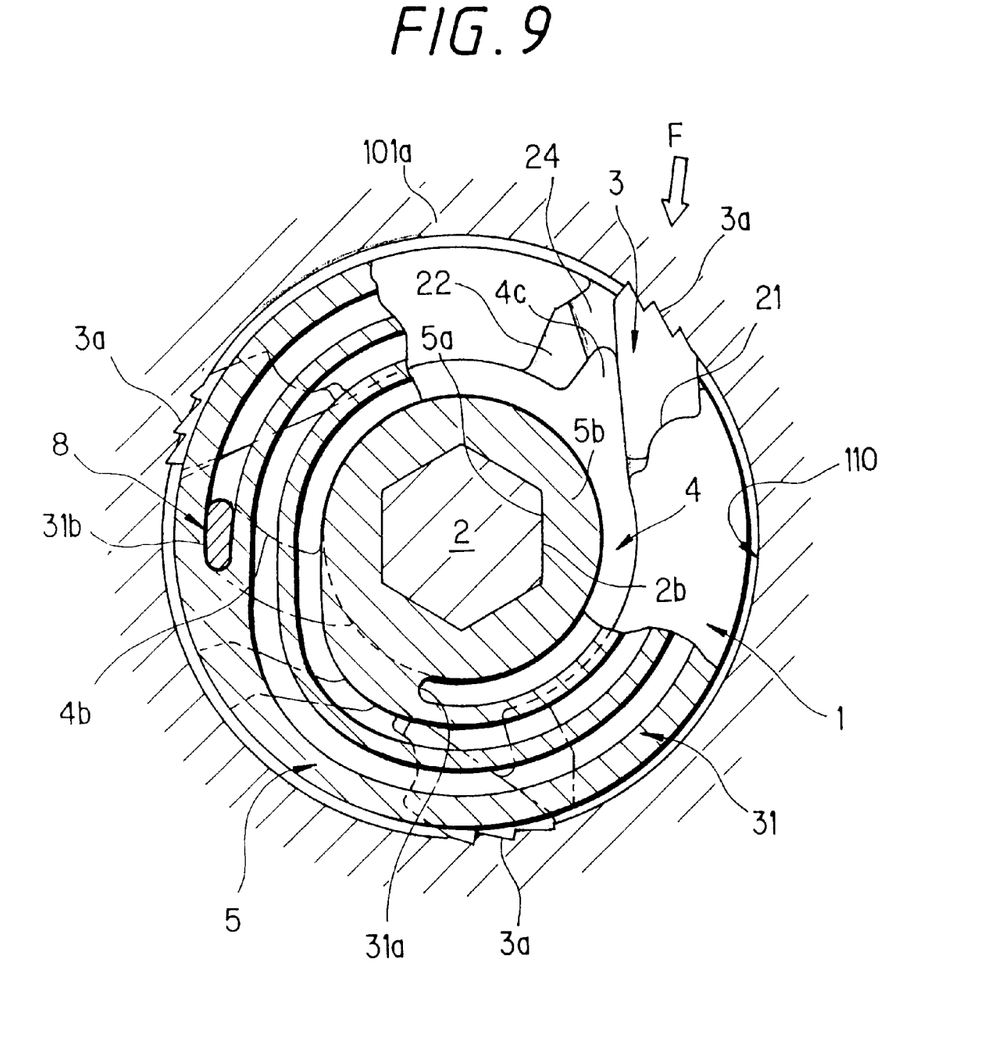
FIG. 9 is a partially broken section view taken along the line V—V shown in FIG. 1, explaining the spirally-shaped cam groove.

In addition, since the respective lock pieces 3 are disposed on the same plane as the inner peripheral surface of the through hole 110 formed in the side plate 101b, as shown in FIG. 9, the securing teeth 3a of the lock pieces 3 oscillated outwardly in the radial direction of the control plate 4 are able to bite the inner peripheral surface of the through hole 110. Here, if the securing teeth 3a are not able to bite the inner peripheral surface of the through hole 110 but slip off the present inner peripheral surface, then the bobbin 1 is rotated further and, with the further rotation of the bobbin 1, the securing teeth 3a of the lock pieces 3 are further oscillated outwardly in the radial direction of the control plate 4 to thereby be able to bite the inner peripheral surface of the through hole 110; that is, finally, the lock pieces 3 can be surely engaged with the inner peripheral surface of the through hole 110, thereby being able to stop the rotation of the bobbin 1 in the webbing drawn-out direction due to the torsional deformation of the torsion bar 2.

At that time, the respective lock pieces 3 receive from the inner peripheral surface of the through hole 110 a reaction which goes in the direction of an arrow F and along the peripheral direction of the bobbin 1. However, since the respective lock pieces 3 are structured such that the base end sides thereof are able to bite in an wedge manner between the cam portions 4c of the control plate 4 and the lock piece support surface 21 of the bobbin 1, the respective lock pieces 3 can be fixed firmly, that is, the mechanical strength of the lock pieces 3 cannot be influenced by the above-mentioned reaction at all.

In addition, since the lock pieces 3 can bite the inner peripheral surface of the through hole 110 in the radial direction thereof, there is no possibility that the lock pieces 3 can apply such a force that spreads out the side plate 101b relative to the side plate 101a in the axial direction of the torsion bar 2, thereby having no influence on the engagement between the pawl 7 and internal toothed ratchet 6.

That is, according to the above-mentioned seat belt retractor 100, in the case where the rotation amount of the bobbin 1 in the webbing drawn-out direction due to the torsional deformation of the torsion bar 2 reaches a predetermined amount, the bobbin 1 is coupled with the retractor base 101 through the lock pieces 3 to thereby stop the rotation of the bobbin 1 in the webbing drawn-out direction and thus stop the torsional deformation of the torsion bar 2. This stopping operation makes it possible to restrict surely the torsional deformation amount of the torsion bar 2 for absorption of the shock energy to a suitable range of amount.

Further, when the energy absorption operation is ended, the rotation of the bobbin 1 is stopped by the retractor base 101 through the lock pieces 3, that is, the bobbin 1 and the retractor base 101 are coupled through a biting-engagement between the lock pieces 3 disposed on the bobbin 1 and the inner peripheral surface of the through hole 110 formed on the retractor base 101.

With this structure, the locking base 5, internal toothed ratchet 6, a pawl 7 and other parts need only to endure/stand a torsional torque applied to the torsion bar 2 but do not need to have a final strength which can endure all of the tension forces finally applied to the webbing after ending the energy absorption operation.

As a result of this, the locking base 5, which has been conventionally molded according to a lost-wax process, or by cold forging, or by MIM, or by sintering, or the like, can be molded by aluminum or zinc die-casting; and, the internal toothed ratchet 6, which has been conventionally molded by cold forging S45C, can be molded by press working SPCC. As a result of this, in manufacturing these parts, there is eliminated the need to use the conventionally required expensive materials and complicated working processes, so that the manufacturing costs of these parts can be reduced.

Still further, according to the present embodiment, the stopper mechanism, which is able to stop the rotation of the bobbin 1 in the webbing drawn-out direction with respect to the retractor base 101, comprises the through hole 110 formed in the side plate 101b, and the lock pieces 3 which are respectively disposed on the locking base side end face of the bobbin 1 and can be engaged with the inner peripheral surface of the through hole 101 to thereby stop the rotation of the bobbin 1 in the webbing drawn-out direction with respect to the retractor base 101, whereby the high-strength engagement, which is capable of standing the rotation torque that has caused the torsional deformation of the torsion bar 2, can be realized with the compact engagement structure.

Moreover, the control plate 4 has only to have such a strength that can bring the lock pieces 3 disposed in the bobbin 1 into engagement with the inner peripheral surface of the through hole 101 when the amount of the torsional deformation of the torsion bar 2 reaches a predetermined amount. Namely, since the required strength of the control plate 4 is not so high, the control plate 4 can be made compact.

This can make compact the stopper mechanism for restricting the torsional deformation amount of the torsion bar 2 to a suitable range, which in turn makes it possible to prevent the retractor from increasing in size.

However, according to the above-mentioned embodiment, the spirally-shaped cam groove 31 is structured in such a manner that the slider 8 can be gradually moved from the initial end portion 31a thereof situated inwardly in the radial direction of the locking base 5 to the terminal end portion 31b situated outwardly in the radial direction of the locking base 5. However, this is not limitative but, for example, the cam groove 31 can also be structured in such a spiral shape that allows the slider 8 to move from an outer position in the radial direction to an inner position in the radial direction, or can also be structured as a C-shaped cam groove depending on the setting of the energy absorption stroke.

However, as in the above-mentioned embodiment, when the slider 8 is so structured as to move from inwardly in the radial direction to outwardly in the radial direction, there can be provided an advantage as follows: that is, when the stopper mechanism 50 is in operation, the slider 8 can be situated outwardly in the radial direction and, therefore, the force to be applied to the slider 8 and the like when the securing teeth 3a are not able to bite the inner peripheral surface of the through hole 110 but slip off the inner peripheral surface can be reduced when compared with a structure in which the slider 8 is situated inwardly in the radial direction, provided that the same torque is applied to the torsion bar 2 in both structures. This in turn can reduce the section area of the slider 8 and narrow the pitch of the spirally-shaped cam groove 31 even in the same space, thereby being able to set a longer energy absorption stroke.

Further, the through hole 110, which serves as a portion to be engaged in the present embodiment, is formed in the side plate 101*b* by drawing the side plate 101*b* inwardly, so that the through hole 110 thus inwardly drawn makes it possible to enhance the bending rigidity of the whole retractor base and also to prevent the bobbin 1 assembly from being removed in the webbing drawn-out direction.

However, especially, when a passenger, who wears the seat belt, has an extremely big body, the relatively long portion of the webbing must be drawn out by the passenger, and in turn the unwound portion of the webbing becomes relatively small. In this case, in the energy absorption operation, there is a possibility that the whole amount of the webbing can be drawn out before starting the operation of the stopper mechanism 50. Even in this case the through hole 110 according to the present embodiment, which is formed by drawing the side plate 101*b* inwardly, can prevent the removal of the bobbin assembly.

On the other hand, as a portion to be engaged which is provided on the locking member side of the retractor base, of course, a member having a sufficient strength which is separately formed with the retractor base but fixed to the retractor base can be used instead of the through hole 110 inwardly drawn.

Also, the emergency lock mechanism according to the present embodiment is structured such that the pawl rotatably supported on the locking base is secured to the portion to be engaged of the retractor to thereby stop the rotation of the locking base in the webbing drawn-out direction thereof. However, the invention is not limited to this structure but, for example, the lock mechanism may be structured such that latch teeth are formed on the locking base and also the pawl is rotatably supported on the retractor base.

Further, the structures of the bobbin, torsion bar, stopper mechanism and stopper operating mechanism are not limited to those illustrated in the above-mentioned embodiments but, of course, according to the invention, these components can be structured in other various manners.

According to a seat belt retractor provided by the invention, after the rotation of a locking member in the webbing drawn-out direction thereof is stopped in a vehicle emergency, if a rotation torque of a predetermined level or more due to a load acting on the webbing is applied between the bobbin and locking member, then the shock energy can be absorbed by the deformation of the plastically deforming member. In addition, when the amount of relative rotation between the bobbin and locking member reaches or exceeds a predetermined amount, then the stopper operating mechanism operates the stopper mechanism to thereby stop directly the rotation of the bobbin in the webbing drawn-out direction with respect to the retractor base, so that the amount of deformation of the plastically deforming member used to absorb the shock energy can be restricted to a suitable range of amount.

Moreover, since the rotation of the bobbin is stopped by the retractor base through the stopper mechanism when the energy absorption operation is ended, other members such as the locking member and the like (for example, the locking base 5, the internal toothed ratchet 6, the pawl 7, the supporting shaft 11) have only to stand only the force that can deform a plastically deforming member (for example, a torsion bar and/or a plastically deformed groove) interposed between the bobbin and locking member, that is, these members need not have a final strength which can endure all of the tension forces finally applied to the webbing after ending the energy absorption operation.

Therefore, according to the invention, it is possible to provide a seat belt retractor including an inexpensive energy absorption mechanism which is surely able to restrict the deformation amount of the plastically deforming member to a predetermined range of amount.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A retractor for use in a seat belt, comprising:

a shaft rotatably mounted on a retractor base and being torsionable;

a bobbin unrotatably fixed to one end of said shaft for winding-up a webbing thereon;

a locking member unrotatably fixed to the other end of said shaft;

an emergency lock mechanism for connecting said locking member with said retractor base and for stopping the rotation of said locking member in a webbing drawn-out direction thereof relative to said retractor base when a vehicle emergency occurs; and a bobbin lock mechanism arranged between said retractor base and said bobbin for connecting said bobbin to said retractor base and for restricting a torsion amount of said shaft to a predetermined amount when the rotation of said locking member in said webbing drawn-out direction is stopped by said emergency lock mechanism.

2. The retractor as set forth in claim 1, wherein said bobbin lock mechanism comprises:

a lock piece supported by said bobbin and capable of taking up a non-engagement position where it is disengaged with said retractor base and an engagement position where it is engaged with said retractor base; and a lock piece operating mechanism for moving said lock piece from said non-engagement position to said engagement position when said shaft is torsionally deformed by said predetermined amount.

3. The retractor as set forth in claim 2, wherein said lock piece operating mechanism comprises:

a control plate integrally rotatable together with said bobbin when said emergency lock mechanism is not operated, but rotatable relative to said bobbin when said emergency lock mechanism is operated and then said control plate becomes immovable with respect to said retractor base in such a manner that said lock piece is moved by said control plate into said engagement position in accordance with said relative rotation between said bobbin and said control plate.

4. The retractor as set forth in claim 3, wherein said bobbin comprises:

a hold member for holding said lock piece at a predetermined position until said control plate and said bobbin become relatively rotatable.

5. The retractor as set forth in claim 3, wherein said control plate is pressed into and fixed to said bobbin.

6. The retractor as set forth in claim 5, wherein said bobbin comprises a rib projection formed on the end face of said bobbin, engageable with and crushable by said control plate, and wherein said rib projection has a triangular cross section and extends in the axial direction of said bobbin.

7. The retractor as set forth in claim 3, wherein said control plate comprises a cam portion for pushing out said lock piece outwardly when said control plate and said bobbin become relatively rotatable with respect to each other; and said bobbin comprises a lock piece support surface for supporting said lock piece when said bobbin is rotated relative to said control plate and said bobbin, in which a surface defined by said cam portion and said lock piece support surface is formed in a wedge shape.

8. The retractor as set forth in claim 3, wherein said lock piece operating mechanism comprises:

a rotation fixing mechanism for engaging said control plate to said retractor base in the rotation direction thereof, after said shaft is torsionally deformed by said predetermined amount.

9. The retractor as set forth in claim 8, wherein said rotation fixing mechanism is provided between said control plate and said locking member.

10. The retractor as set forth in claim 9, wherein said rotation fixing mechanism comprises:

a guide portion formed in said locking member and extending by a predetermined amount in the rotation direction of said shaft;

a slider movable along said guide portion; and a slider holding portion formed in said control plate for slidably holding said slider.

11. The retractor as set forth in claim 10, wherein said guide portion is formed in a spiral shape.

12. The retractor as set forth in claim 11, wherein said slider is disposable on an initial end position which is located at the inner peripheral side of said spirally-shaped guide portion.

13. The retractor as set forth in claim 12, wherein said retractor base includes a through hole through which said shaft extends, and said lock piece is engageable with the inner peripheral surface of said through hole.

14. The retractor as set forth in claim 13, wherein said through hole is formed in said retractor base by drawing the same in a direction where said shaft extends.

15. The retractor as set forth in claim 13, wherein the inner peripheral surface of said through hole is knurled.

16. A retractor for use in a seat belt, comprising:

a retractor base;

a substantially cylindrically-shaped bobbin rotatably supported on said retractor base for winding-up a webbing thereon;

a locking member connectable with said retractor base so as to stop the rotation of said locking member in the webbing drawn-out direction relative to said retractor base when a vehicle emergency occurs;

a shaft, rotatably mounted on said retractor base and being torsionable, for fixedly connecting said bobbin to said locking member when said shaft is subjected to a torsional torque smaller than a predetermined torque, and also for relatively rotating said bobbin relative to said locking member through a torsional deformation of said shaft when said shaft is subjected to a torsional torque not smaller than a predetermined torque;

a stopper mechanism provided between said retractor base and said bobbin for stopping the rotation of said bobbin in said webbing drawn-out direction with respect to said retractor base; and, a stopper operating mechanism for operating said stopper mechanism to thereby stop the rotation of said bobbin in said webbing drawn-out direction with respect to said retractor base when an amount of relative rotation between said bobbin and said locking member in accordance with said torsional deformation of said shaft reaches a predetermined amount.

17. The retractor as set forth in claim 16, wherein said stopper mechanism comprises:

a peripheral surface defined by a through hole which is formed in said retractor base, said shaft extending through said through hole; and a lock piece supported by said bobbin and capable of taking up a non-engagement position where it is disengaged with said retractor base and an engagement position where it is engaged with said retractor base.

18. The retractor as set forth in claim 17, wherein said stopper operating mechanism comprises:

a control plate integrally rotatable together with said bobbin when said emergency lock mechanism is not operated, but rotatable relative to said bobbin when said emergency lock mechanism is operated and then said control plate becomes immovable with respect to said retractor base in such a manner that said lock piece is moved into said engagement position in accordance with said relative rotation between said bobbin and said control plate.

19. The retractor as set forth in claim 18, wherein said stopper operating mechanism further comprises:

a rotation fixing mechanism for fixedly engaging said control plate to said locking member in the rotation direction thereof after said shaft is torsionally deformed by said predetermined amount.

20. The retractor as set forth in claim 19, wherein said rotation fixing mechanism is interposed between said control plate and said locking member.

21. A retractor as set forth in claim 20, wherein said rotation fixing mechanism comprises:

a guide portion formed in said locking member and extending by a predetermined amount in the rotation direction of said shaft;

a slider movable along said guide portion; and a slider holding portion formed in said control plate for slidably holding said slider.

* * * * *